Jan. 22, 1935.  A. G. HEGGEM  1,989,009
VALVE
Filed March 22, 1934  4 Sheets-Sheet 1
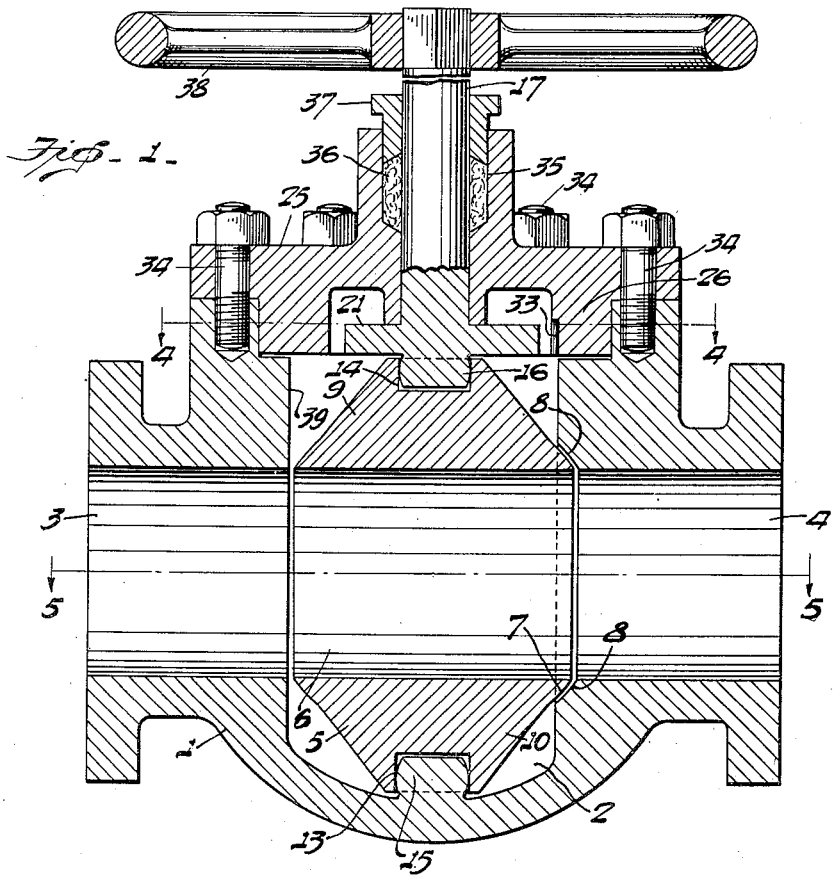
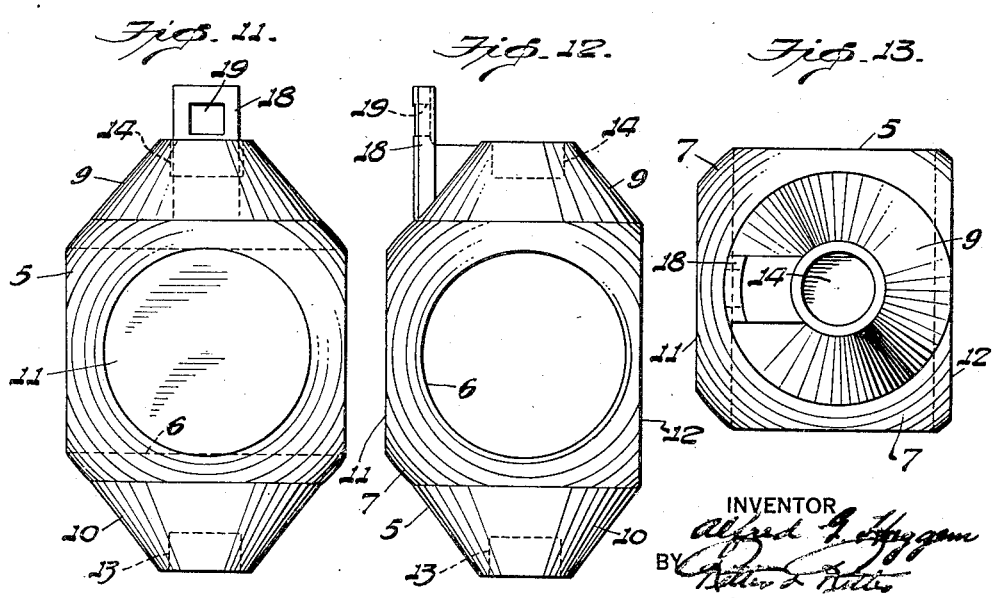
INVENTOR
Alfred G. Heggem
BY
his ATTORNEYS Jan. 22, 1935. A. G. HEGGEM 1,989,009
VALVE
Filed March 22, 1934 4 Sheets-Sheet 2
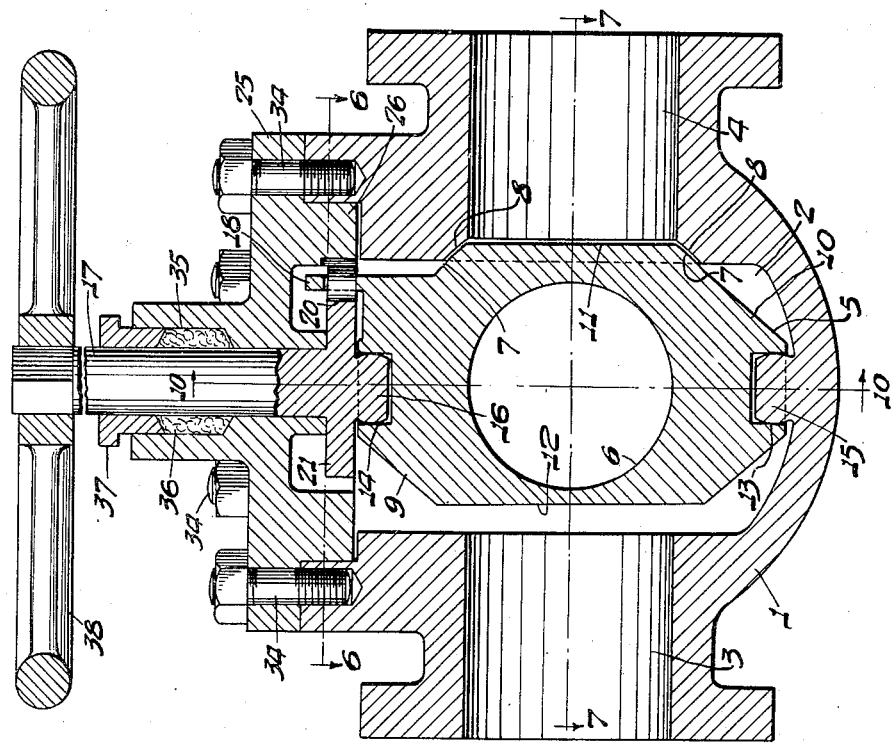
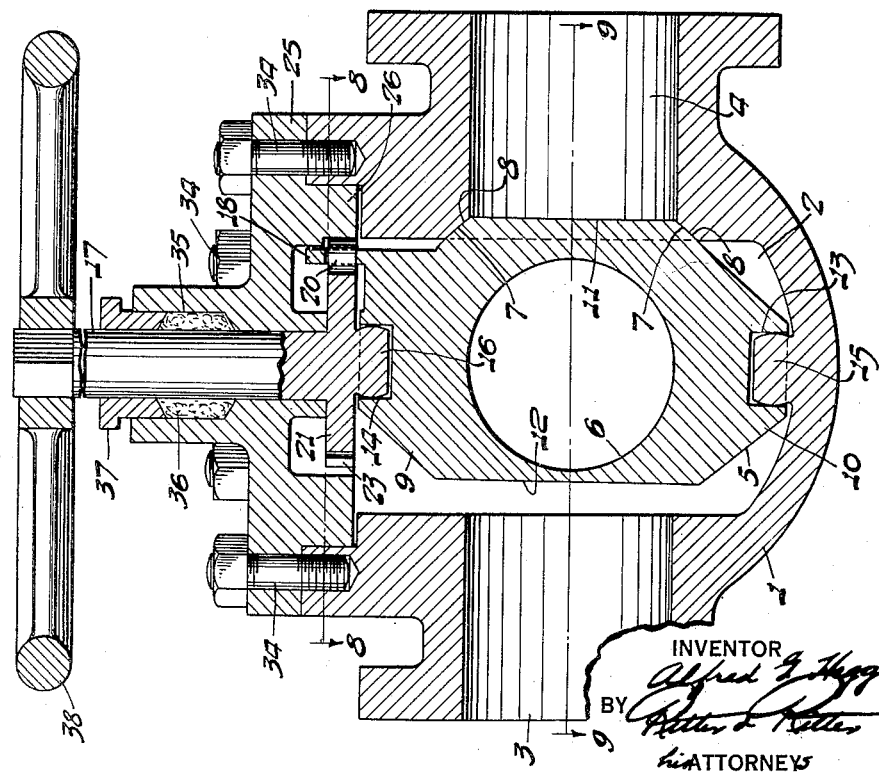
INVENTOR
Alfred G. Heggem
BY
his ATTORNEYS Jan. 22, 1935. A. G. HEGGEM 1,989,009
VALVE
Filed March 22, 1934 4 Sheets-Sheet 3
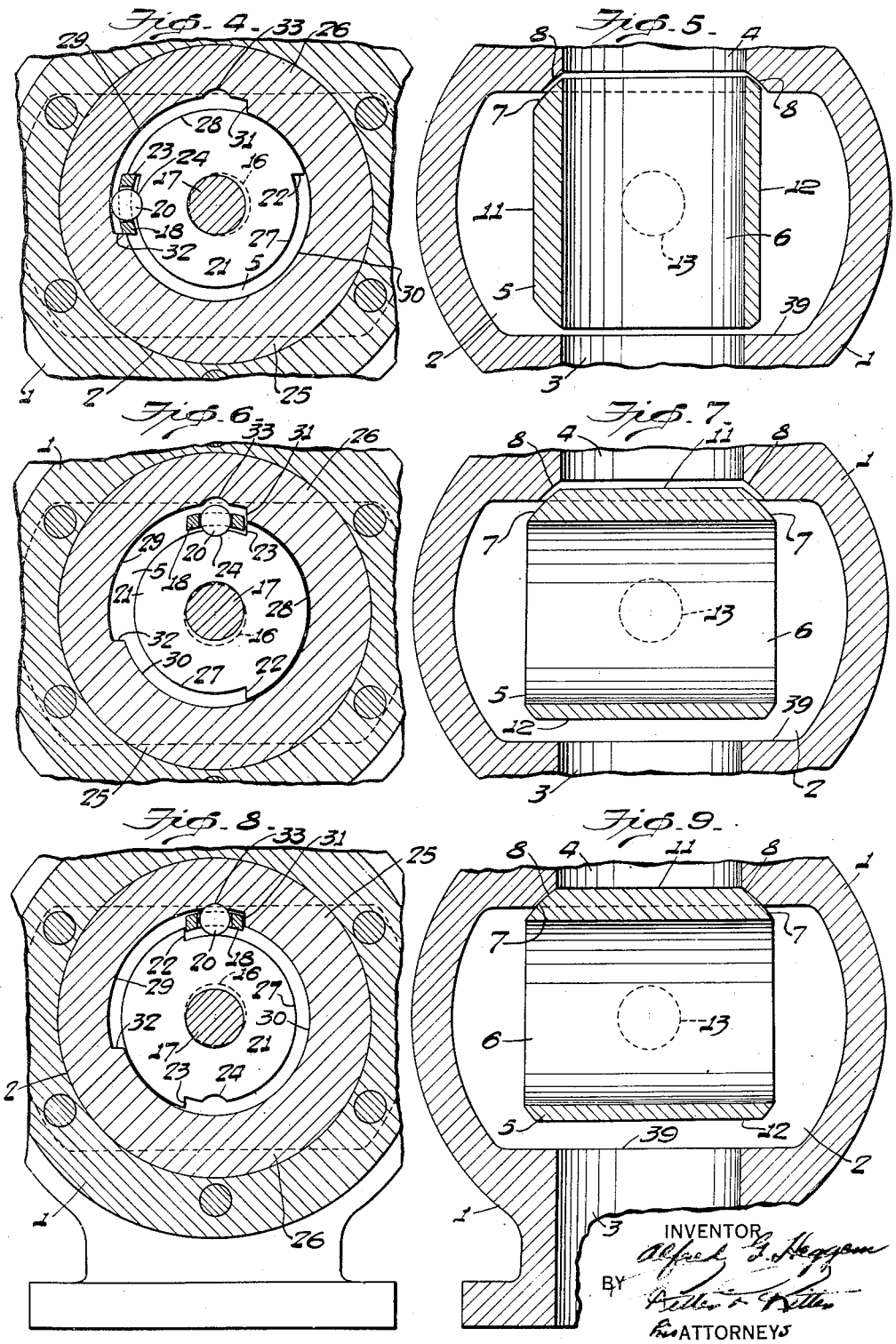

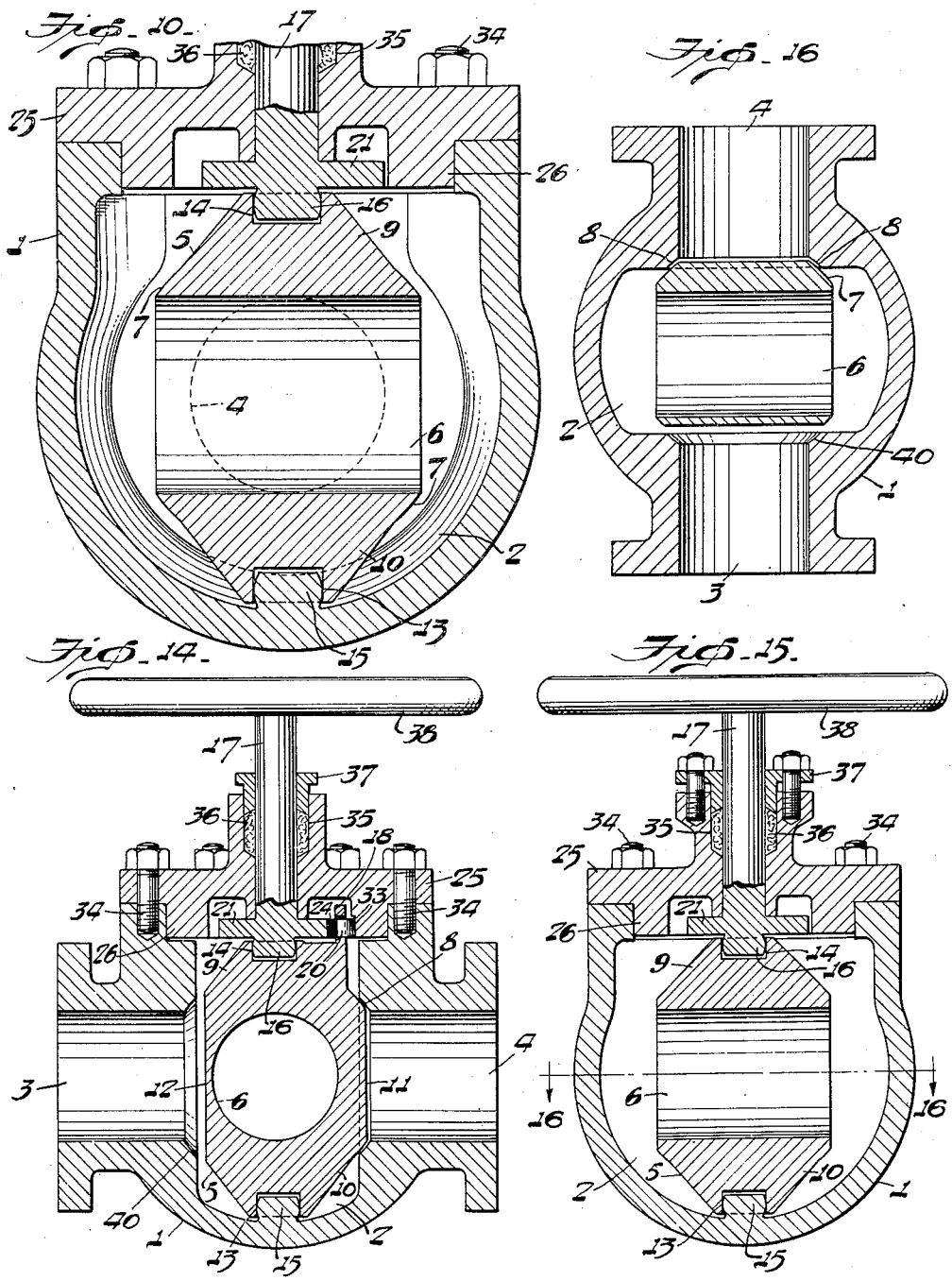

Patented Jan. 22, 1935

1,989,009

UNITED STATES PATENT OFFICE 1,989,009

VALVE

Alfred G. Heggem, Tulsa, Okla.

Application March 22, 1934, Serial No. 716,884

21 Claims. (Cl. 251—91)

My invention relates to valves for controlling the flow of fluid and is especially suitable for embodiment in valves designed to withstand high pressures.

The principal object of the invention is to provide a simple and efficient valve structure which may be quickly opened and closed and in which the several parts thereof positively and reliably perform their functions throughout the sequence of operations.

A principal feature of the invention consists in constructing the valve with a body member having a valve receiving chamber which communicates with an inlet opening and an outlet opening permitting flow of fluid through the valve and in positioning in said chamber a rotatable valve member or core which is additionally capable of a tilting motion with respect to the valve body to cause it to alternately seal and open one of said openings in the valve body to thereby control the flow of fluid through said body.

A further feature of the invention consists in constructing the valve with a body member formed with a valve receiving chamber which is in communication with an inlet opening and an outlet opening affording passage of fluid through the valve, and in combining therewith means for controlling the flow of fluid through said openings, said means including a rotatable member whose axis of rotation is adapted to be shifted so as to assume an inclined position, a stem member rotatable with respect to said body and said rotatable member, means actuated by said stem member for tilting said rotatable member to shift the angular position of its axis of rotation, latch means carried by the rotatable member and operating during the tilting movement thereof for preventing rotation of said rotatable member with respect to the valve body, and means movable with said stem for cooperating with said latch means to cause said rotatable member to be releasably locked to the valve body.

Further features of the invention residing in the particular combinations of parts and advantageous features of elemental construction will hereinafter appear and be pointed out in the claims.

In the drawings illustrating preferred embodiments of the invention:

Figure 1 is a central sectional view of a valve embodying the invention, the parts being in open position.

Figure 2 is a view corresponding to Figure 1 but illustrating the rotatable valve member disposed in an approximately closed position but out of sealing contact with the valve body.

Figure 3 is a longitudinal sectional view of the valve showing the parts in the relations they occupy when the valve is fully closed.

Figure 4 is a detail sectional view on the line 4—4 of Figure 1.

Figure 5 is a sectional view on the line 5—5 of Figure 1.

Figure 6 is a detail sectional view on the line 6—6 of Figure 2.

Figure 7 is a sectional view on the line 7—7 of Figure 2.

Figure 8 is a sectional view on the line 8—8 of Figure 3, showing the positions assumed by the parts when the valve is fully closed.

Figure 9 is a sectional view on the line 9—9 of Figure 3.

Figure 10 is a vertical sectional view on the line 10—10 of Figure 2.

Figure 11 is a detail elevational view of the rotatable valve member or core.

Figure 12 is a detail sectional view of the rotatable valve member, the view being taken at right angles to that of Figure 11.

Figure 13 is a detail plan view of the rotatable valve member or core.

Figure 14 is a view corresponding to Figure 2 but illustrating a somewhat modified form of the invention.

Figure 15 is a sectional view of a modified form of the invention, the section being taken at right angles to that of Figure 14.

Figure 16 is a sectional view on the line 16—16 of Figure 15.

In the form of the invention illustrated in Figures 1 to 13, inclusive, of the drawings, the valve body 1 is formed with a chamber 2 which is in open communication with an inlet opening 3 and an outlet opening 4 for permitting the flow of fluid through the valve body. The openings 3 and 4 are preferably in axial alinement.

The valve chamber 2 is open at one side to permit the introduction of a rotatable valve member or valve core 5. The valve core is formed with a passage 6 which is preferably cylindrical throughout and of a diameter corresponding to that of the openings 3 and 4 of the valve body so as to afford a straight uninterrupted passage for the fluid when the valve is open. The intermediate portion of the core 5 is provided with a spherical peripheral surface 7 which is of sufficient extent to seal the outlet opening 4 by contacting with the correspondingly curved seat 8 of the valve body at the inner end of said outlet opening, said spherical peripheral surface preferably being of sufficient extent so as to border the margins of the passage 6 through the valve core, as illustrated in Figures 12 and 13. The end portions of the rotatable valve member are preferably of conical form, as indicated at 9 and 10, respectively, and the intermediate portion of the core is preferably formed on opposite sides of the passage 6 with flat exterior surfaces 11 and 12, respectively, which are parallel to the axis of the passage 6.

The core 5 is rotatable with respect to the valve body so as to bring its opening or passage 6 into and out of axial alinement with the openings 3 and 4 of the valve body, and said core is also capable of tilting so as to cause its spherical surface to move into and out of tight sealing contact with the correspondingly curved bearing face or valve seat 8 at the inner end of the outlet opening 4 of the valve body. For permitting the core member 5 to rotate on an axis coincident with the axis of the valve chamber 2 and also to tilt so as to cause an angling displacement of its axis with respect to the axis of the valve chamber, the core is preferably fashioned with oppositely indented trunnion sockets 13 and 14, respectively. The socket 13 receives a corresponding trunnion 15 which projects upwardly from the lower portion of the valve body, while the socket 14 receives a corresponding trunnion 16 formed on the inner end of the rotatable valve stem 17, the peripheral surfaces of the trunnions being spherically curved to permit the core member 5 to tilt with respect to the valve body and the valve stem. By this means the rotatable valve member 5 is permitted to rotate on an axis coincident with the axis of the valve chamber 2 and also to be capable of a tilting movement, while thrusts due to fluid pressure are effectively transmitted from the rotatable core to the valve body. As will hereinafter appear, the core member 5 and stem 17 are releasably locked together during the initial portion of the valve closing rotation of the stem and also during the final portion of the valve opening rotation of this stem, so that during such portions of the rotation of the stem 17 the rotatable core 5 is caused to rotate on the axis of the valve chamber and of the stem. The trunnion 16 at the lower end of the valve stem is, however, formed with an axis of revolution which is parallel but not coincident with the axis of the valve stem so that said trunnion 16 functions as an eccentric to cause the rotatable core 5 to tilt upon the lower trunnion 15 when the valve stem is released from locking connection with the core member and rotates with respect thereto.

To insure that the elements of the valve shall perform their functions with precision and in proper sequence, means are provided for releasably latching the rotatable core 5 to the rotatable stem 17 and for positively preventing rotation of the core with respect to the valve body 1 when the stem, upon being unlatched from the core, turns with respect thereto. For this purpose it is preferred to provide a latching mechanism mounted on the outer end of the core 5, said latching mechanism being advantageously constituted as a lug 18 integral with the core and perforated, as at 19, to receive a movable latch 20 which preferably is formed as a cylindrical roller. As shown in the drawings, the diameter of the roller 20 is greater than the thickness of the slotted lug 18 in which it is mounted so that, as is well shown in Figures 4, 6 and 8, it may serve as a means for releasably locking the core 5 alternately to the valve stem and the valve body.

Fixed rigidly with respect to the valve stem 17 and located outwardly of the eccentric trunnion 16 with which the stem is provided, is an arcuate member 21, the periphery of which is preferably circularly curved with the axis of the stem as center. The curved periphery of the plate or disk member 21 is preferably formed as two arcs, 27 and 28, respectively, of different diameters connected by shoulders 22 and 23, the lug 22 being adapted to come into contact with the latch lug 18 of the core member 5 when the valve stem is rotated to close the valve, and the lug 23 being adapted to make engagement with the lug 18 when the valve stem is actuated to open the valve. Adjacent the shoulder 23 the arcuate member 21 is formed with a notch or recess 24 into which the roller or latch 20 may move during an opening rotation of the valve stem and core 5. In addition to cooperating with the disk or arcuate member 21 carried by the valve stem, the movable latch 20 also cooperates with the valve body by cooperating with the cover member 25 of the body. This cover portion of the body is provided with a curved flange portion 26, the inner surface of which is curved on circular arcs 29 and 30 of different diameters whose center is the axis of the valve stem and which are connected by spaced shoulders 31 and 32, respectively. In the arcuate portion 29 of the flange 26 is a notch 33 which is adapted to receive a minor portion of the latch 20 when the valve core 5 reaches the end of its rotary movement during the operation of closing the valve. As shown in Figures 4 and 6, the shoulders 31 and 32 are adapted to cooperate with the lug 18 of the valve core 5 to thereby limit the extent of the opening and closing rotations of the core.

The cover 25 may be conveniently secured to the valve body member 1 by threaded studs 34 and cooperating nuts. The cover through which the valve stem 17 extends is provided with a packing chamber 35 to receive packing 36, the latter being compressed by means of a suitable gland or follower 37. A hand-wheel 38 is provided for rotating the valve stem.

To assemble the valve core 5 in the valve body the core is turned to a position such that the passage 6 therethrough extends transversely of the passageway through the valve body formed by the openings 3 and 4 therein, the core being in a position turned 180° from the position it occupies when the valve is closed. In this position it may be introduced into the chamber 2 of the valve body and thereafter turned to proper position. Or the core may be assembled in the valve body by bringing it into a position corresponding to a closed position and inserting it at an angle through the opening of the valve chamber and thereafter rocking it back to closed position. The assembly of the valve is completed by applying the valve cover 25, the valve stem, the hand-wheel and their associated parts. In order either to assemble or disassemble the valve core, the passageway 6 through the core should be positioned transversely of the passageway through the valve body. To afford clearance for enabling the introduction of the valve core, the wall 39 of the valve body is at a greater radial distance from the axis of the valve chamber than is the opposite wall of the valve body in which the valve seating surface 8 is formed, thus enabling the area of the valve seat 8 to be made advantageously large. The maximum diameter of the core 5 is less than the diameter of the opening into the valve chamber and the core is so formed that its side 12 is at a less distance from the axis of the trunnion sockets 13 and 14 than is the surface 11.

The operation of the valve is as follows:

Assuming the valve to be fully open, as illustrated in Figures 1, 4 and 5, rotation of the hand-wheel 38 in a clockwise direction will cause a corresponding rotation of the arcuate disk 21 carried by the valve stem 17. As, at this time, the latch 20 mounted on the rotatable core 5 projects into the notch or recess 24 of the member 21, the core is caused to rotate with the disk 21 and valve stem until the latch comes opposite the notch 33 in said flange, at which time the lug 18 on the rotatable valve core has come into abutting relation with the stop shoulder 31 of the flange and the rotation of the valve core 5 on its axis is arrested, the parts then being in the position shown in Figures 2 and 6. During this portion of the opening rotation of the valve stem the latch 20 moves in contact with the arcuate surface 29 of the flange 26 of the valve cover plate and the latch is thus prevented from escaping from the notch 24 of the arcuate member 21 carried by the valve stem. When the clockwise rotation of the valve stem has progressed to the point where the lug 18 of the rotatable valve core comes into contact with the stop shoulder 31 the latch 20 stands opposite the notch 33 in the flange 26 of the cover, so that the continued clockwise rotation of the valve stem and arcuate member 21 causes the latter to press against the latch 20 and roll or force it outwardly into the notch 33, thereby unlatching the valve stem from the rotatable core member 5 and permitting the stem to continue its rotation in the valve closing direction. During the remainder of the valve closing rotation of the stem, the latch 20 rides along the curved surface 27 of the arcuate member 21, and thus is prevented from escaping from the notch 33 of the flange member 26 until, upon a subsequent opening rotation of the valve stem, the notch 24 in the plate 21 comes opposite the latch. The axial rotation of the valve core 5, which is performed in unison with the rotation of the valve stem in a clockwise direction, causes the passage 6 through the core to assume a position transverse to the inlet opening 3 and outlet opening 4 of the valve body and brings the spherical peripheral portion 7 of the core into overlapping relation with the correspondingly curved seating surface 8 on the valve body at the inner end of the outlet opening 4. At this stage in the closing operation of the valve the sealing surfaces 7 and 8 have not come into contact, but are slightly separated, as shown in Figure 2. This results from the fact that so long as the valve stem and valve core member 5 are locked together and rotate as one in the closing direction, the eccentric at the inner end of the valve stem is incapable of causing any angular displacement of the axis of the core or tilting movement of the core on the trunnion 15 of the valve body and, consequently, the surface 7 of the core remains in spaced relation to the valve body until the core has fully overlapped the outlet opening 4. By this means scoring of the valve and frictional resistance is prevented in turning. When the valve face 7 has come into proper axial alinement with the seating surface 8 to prevent flow of fluid through the valve, the continued clockwise or closing rotation of the valve stem 17 causes the eccentric 16 to move the outer end of the valve core 5 outwardly in a radial direction with respect to the axis of the valve chamber 2 and valve stem 17, thereby causing the valve core to tilt on the trunnion 15 of the valve body so as to effect an angular displacement of the axis of the core. This tilting movement forces the valve face 7 into firm contact with the corresponding valve seat 8, the valve being then fully closed, as illustrated in Figures 3, 8 and 9.

The operation of opening the valve is as follows:

Assuming the valve to be fully closed, as illustrated in Figures 3, 8 and 9, a counter clockwise rotation of the hand-wheel 38 produces a corresponding turning movement of the valve stem 17 and the arcuate member 21 and eccentric trunnion 16 carried thereby. As the latch 20 at this time projects into the notch 33 of the cover flange 26 and its engagement with the arcuate surface 27 of the disk 21 prevents it from escaping from said notch, the valve core member 5 is locked to the valve body and is prevented from rotating with the valve stem. During this initial opening rotation of the valve stem 17, however, the eccentric trunnion 16 carried by the stem cooperates with the valve core member 5 to cause the latter to tilt upon the trunnion 15 of the valve body thereby retracting the curved face 7 of the core from engagement with the correspondingly curved valve seat 8 of the valve body. When the opening or counter-clockwise rotation of the valve stem has proceeded until the notch 24 in the arcuate disk 21 stands opposite the latch 20, as shown in Figure 6, the tilting movement of the core member 5 upon the trunnion 15 is completed and the core is supported in a position in which it is free from engagement with the valve body. At the time the notch 24 of the arcuate disk 21 reaches a position in which it stands opposite the latch 20 carried by the core, the shoulder 23 on the member 21 comes into engagement with the lug 18 of the core in which the latch is slidably mounted. Further counter clockwise or opening rotation of the stem 17 thereupon causes the valve core 5 to rotate counter clockwise along with the stem. As the valve core begins its opening rotation on the axis of the valve chamber 2 and the stem 17, the latch 20 is forced out of the notch 33 and enters the notch 24 of the arcuate disk 21 carried by the valve stem, thus unlatching the valve core 5 from the valve body and latching it to the member 21. Rotation of the valve stem and the valve core 5 continues until the lug 18 of the valve core strikes the stop shoulder 32 on the curved flange 26 of the cover of the valve body, at which time the valve is fully open, as shown in Figures 1, 4 and 5. During the axial rotation of the valve core 5 following the tilting movement of the core on the trunnion 15 during the opening of the valve, the latch 20, after moving out of the notch 33 of the flange member 26 and into the notch 24 of the arcuate member 21, travels along the curved surface 29 of the valve cover member and is thus restrained from escaping from the notch 24, with the result that the core 5 remains locked to the arcuate member 21 carried by the valve stem 17 and the direction of rotation of the core may therefore be reversed to close the valve without the necessity of first turning the core to fully open position.

The modified form of the construction shown in Figures 14, 15 and 16 illustrates how the valve may be provided with a valve seat 40 bordering the inner end of the passage 3, as well as being provided with the valve seat 8 at the end of the passage 4. This is accomplished by making the walls of the valve body in which the seats 8 and 40 are formed at equal distances from the axis of the valve chamber and spaced apart sufficiently to afford clearance for the introduction of the valve core. In this construction, of course, the area of the valve seat 8 is somewhat less than that of the construction heretofore described. By providing the valve body with the valve seat 40 adjacent the opening 3 in addition to the valve seat 8 adjacent the opening 4, it is possible to assemble the valve so that the core member 5 may cooperate either with the seat 8 or the seat 40, as may be desired, it being merely necessary to assemble the valve core, the cover 25 and valve stem 17 in proper position with respect to the valve body to give the desired result.

Other features of the construction shown in Figures 14, 15 and 16 are the same in form and function as the corresponding features heretofore described and accordingly have been indicated by corresponding reference numerals.

Within the entire cycle of operation the engagements and disengagements of parts are positive and are so timed that they occur at fixed positions. This permits the opening and closing operations to be reversed at any stage without interfering with the effective functioning of the various parts. Thus, the valve core 5 may be released from contact with the valve seat 8 and then immediately forced again into contact therewith, thereby permitting the "cracking" of the valve to any degree and with precision regardless of the course of movement, which might otherwise be stated as the complete uniformity of operation where "cracking" and "throttling" become identical operations.

Having shown and described the best form in which I contemplate applying the principle of the invention, what I claim is:

1. A valve involving a valve body having an inlet opening and an outlet opening and a chamber communicating with said openings and means for controlling the flow of fluid through said openings, said means including a valve core disposed within said chamber and rotatable with respect thereto, a valve stem rotatable with respect to said valve core and valve body, and means controlled by the rotation of the valve stem for alternately rotating and tilting said valve core.

2. A valve involving a valve body having an inlet opening and an outlet opening and a chamber communicating with said openings and means for controlling the flow of fluid through said openings, said means including a rotatable valve core disposed within said chamber and journaled to said valve body, a valve stem extending into said chamber for rotating said valve core, and means controlled solely by the rotation of said valve stem for tilting said valve core angularly with respect to the axis of said valve chamber.

3. A valve involving a valve body having an inlet opening and an outlet opening and a chamber communicating with said openings and means for controlling the flow of fluid through said openings, said means including a valve core disposed within said chamber and journaled to said valve body, a valve stem journaled to said valve core, means operatively interposed between said valve stem and core and actuated by said stem for rotating said core, and means actuated solely by the rotation of said stem for tilting said valve core angularly with respect to the axis of said stem.

4. A valve involving a valve body having an inlet opening and an outlet opening and a chamber communicating with said openings and means for controlling the flow of fluid through said openings, said means including a valve stem extending into said chamber, a valve core disposed within said chamber, means for alternately locking said valve core to said valve body and to said stem, and means controlled by rotation of said valve stem for tilting said valve core angularly with respect to the axis of said chamber when said valve core is locked against rotation with respect to said valve body.

5. A valve involving a valve body having an inlet opening and an outlet opening and a chamber communicating with said openings, and means for controlling the flow of fluid through said openings, said means including a valve core disposed within said chamber and journaled to said valve body, a valve stem journaled to said valve core and capable of rotation independently thereof on an axis angular to the axis of said valve core to permit said valve core to tilt into and out of engagement with the valve body, and locking means actuated by rotation of said valve stem to cause said valve core to rotate with said valve stem during a portion only of the rotation of said valve stem.

6. A valve involving a valve body having an inlet opening and an outlet opening and a chamber communicating with said openings, and means for controlling the flow of fluid through said openings, said means including a rotatable valve core disposed within said chamber and journaled to said valve body, a valve stem journaled to said valve core to effect rotation of said valve core and capable of rotation independently thereof, and means actuated by the rotation of said valve stem for tilting said valve core angularly with respect to the axis of said chamber when said valve stem is rotated independently of the rotation of said valve core.

7. A valve involving a valve body having an inlet opening and an outlet opening and a chamber communicating with said openings, and means for controlling the flow of fluid through said openings, said means including a valve seat surrounding one of said openings, a rotatable valve core disposed within said chamber and rotatable with respect thereto, said valve core having an opening therethrough for the passage of fluid and formed with an imperforate side adapted to obstruct the flow of fluid, said side being provided with a valve face, a valve stem journaled to said valve core to effect rotation thereof, and positive means actuated by rotation of said valve stem for tilting said valve core angularly with respect to the axis of said chamber to force said valve face against said valve seat.

8. A valve involving a valve body having an inlet opening and an outlet opening and a chamber communicating with said openings, and means for controlling the flow of fluid through said openings, said means including a valve stem extending into said chamber and rotatable with respect to said body, a rotatable valve core disposed within said chamber and rotatable with said valve stem with respect to said valve body, stops on said valve stem to limit rotation thereof, means for rotating said stem, and means actuated by rotation of said valve stem for tilting said core, angularly with respect to the axis of said chamber.

9. A valve involving a valve body having an inlet opening and an outlet opening, and a chamber communicating with said openings, and means disposed within said chamber for controlling the flow of fluid through said openings, said means including a cover member for closing said chamber, a valve stem extending through said cover member, a valve core disposed within said chamber, means for alternately locking said core against rotation with respect to said body and to said stem, means controlled by the rotation of said stem for tilting said core angularly with respect to the axis of said chamber when said core is locked against rotation with respect to said body, stops carried by said stem to limit rotation thereof, and stops fixed with relation to said body for limiting rotation of said valve core.

10. A valve involving a valve body having an inlet opening and an outlet opening, a valve seat surrounding one of said openings, a valve stem extending into said body, a rotatable valve core disposed within said body and provided on one side with a valve face fixed with respect thereto, means operatively interposed between said valve stem and core and actuated by said valve stem for rotating said core, and means actuated by the rotation of the stem for tilting said core to positively force said valve face against the valve seat.

11. A valve involving a valve body having an inlet opening and an outlet opening and a chamber communicating with said openings, and means for controlling the flow of fluid through said openings, said means including a rotatable valve core disposed within said chamber and having an opening for passage of fluid, said valve core being adapted to have a tilting motion in addition to its rotary motion, a valve stem for rotating said valve core, and means actuated by said valve stem for tilting said valve core, said tilting means operating only in one fixed position of the valve core with respect to the valve body.

12. A valve involving a valve body having an inlet opening and outlet opening and a chamber communicating with said openings, and means for controlling the flow of fluid through said openings, said means including a rotatable valve core disposed within said chamber, a stem rotatable with respect to said valve core and the valve body, and means for releasably latching said stem to said valve core, said valve core having tilting cooperation with the valve body and means to rotate and to tilt said valve core with respect to said body in response to respectively different portions of the rotating movement of said stem.

13. A valve involving a valve body having an inlet opening and outlet opening and a chamber communicating with said openings and means for controlling the flow of fluid through said openings, said means including a rotatable valve core disposed within said chamber, and means for releasably latching said valve core against rotation with respect to said valve body, said valve core having tilting cooperation with the valve body when so latched and being rotatable with respect to said valve body when unlatched.

14. A valve involving a valve body having an inlet opening and outlet opening and a chamber communicating with said openings, and means for controlling the flow of fluid through said openings, said means including a rotatable valve core disposed within and movable radially of said chamber, a stem rotatable with respect to said valve core and the valve body, an eccentric engaging said valve core and rotatable by the rotation of said stem, and means for releasably locking said valve core to said stem during a portion of the rotation of the latter.

15. A valve involving a valve body having an inlet opening and outlet opening and a chamber communicating with said openings, a rotatable valve core journaled to said valve body and adapted to close one of said openings, a rotatable valve stem journaled to said valve core and rotatable with respect thereto, and means actuated by said stem for causing said valve core to alternately rotate and tilt radially.

16. The combination of a valve body having a passage therethrough, a rotary valve core mounted in said valve body and having an opening therethrough, a valve stem for rotating said valve core to cause the opening therethrough to align with said passage or to move out of register with said passage, and means actuated by rotation of said valve stem for positively tilting said core to cause it to seal one of said openings.

17. A valve comprising a valve body, a rotatable valve core within said body and having a transverse bore, a stem for moving said core, said stem being adapted to turn but not to move lengthwise, cam means mounted on said stem for tilting said core, and means for releasably connecting said stem and valve core to effect rotation of said core.

18. A valve involving a valve body having openings permitting the passage of fluid therethrough, said body having a valve seat surrounding one of said openings, a rotatable valve core adapted to obstruct the flow of fluid through said openings, said valve core being provided with a valve face for cooperating with said valve seat, means including a valve stem for rotating said valve core, and means actuated by rotation of said valve stem for tilting said valve core to positively force said valve face against said valve seat.

19. A valve involving a valve body having an inlet opening and an outlet opening and a chamber communicating with said openings, and means for controlling the flow of fluid through said openings, said means including a rotatable valve core mounted within said chamber and adapted to obstruct the flow of fluid through said openings, said valve core being provided with a valve face and said body being provided with a valve seat surrounding one of said openings, a member relatively movable with respect to said body and said valve core, and means actuated by said relatively movable member for alternately rotating and tilting said valve core.

20. A valve involving a valve body having an inlet opening and an outlet opening, said body being provided with a valve seat surrounding one of said openings, a valve core disposed within said body and provided on one side with a valve face fixed with respect thereto, a rotatable valve stem, and means actuated by said stem for alternately rotating said valve core and for tilting it to positively force said valve face against said valve seat.

21. A valve involving a valve body having an inlet opening and an outlet opening and a chamber communicating with said openings, and means for controlling the flow of fluid through said openings, said means including a rotatable valve core adapted to obstruct the flow of fluid through said openings, means for mounting said valve core within said chamber to enable it to rotate and tilt with respect to said body, said body being provided with a valve seat surrounding one of said openings and said valve core being provided with a valve face for unyielding sealing cooperation with said valve seat, means for rotating said valve core, said last named means and said valve core being relatively movable, and means actuated by said last named means for tilting said valve core with respect to said body to cause said valve face to positively seat against said valve seat.

ALFRED G. HEGGEM.